US009912480B2

(12) United States Patent
Quinn et al.

(10) Patent No.: US 9,912,480 B2
(45) Date of Patent: Mar. 6, 2018

(54) NETWORK SERVICE PACKET HEADER SECURITY

(71) Applicant: Cisco Technology, Inc., San Jose, CA (US)

(72) Inventors: Paul Quinn, Wellesley, MA (US); Scott Fluhrer, North Attleboro, MA (US); Jim Guichard, New Boston, NH (US); Tirumaleswar Reddy, Bangalore (IN); Prashanth Patil, Mountain View, CA (US); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/442,722

(22) Filed: Feb. 27, 2017

(65) Prior Publication Data
US 2017/0237562 A1    Aug. 17, 2017

Related U.S. Application Data

(63) Continuation of application No. 14/726,534, filed on May 31, 2015, now Pat. No. 9,621,520.

(30) Foreign Application Priority Data

Mar. 19, 2015   (IN) .......................... 1375/CHE/2015

(51) Int. Cl.
H04L 12/24       (2006.01)
H04L 9/32        (2006.01)
(Continued)

(52) U.S. Cl.
CPC .......... H04L 9/3213 (2013.01); H04L 9/0861 (2013.01); H04L 63/0428 (2013.01); H04L 63/06 (2013.01)

(58) Field of Classification Search
None
See application file for complete search history.

(56) References Cited

U.S. PATENT DOCUMENTS 5,134,610 A    7/1992    Shand et al.
6,970,943 B1   11/2005   Subramanian et al.
(Continued)

FOREIGN PATENT DOCUMENTS

WO    WO 0241101 A2 *    5/2002    ......... H04L 63/0428

OTHER PUBLICATIONS

Experiences from Implementing the ETSI ITS SecuredMessage Service. Nowdehi et al. IEEE(2014).*
(Continued)

Primary Examiner — Venkat Perungavoor
(74) Attorney, Agent, or Firm — Samuel M. Katz

(57) ABSTRACT

A network service packet (NSP) header security method includes receiving an NSP on a communication interface, analyzing, by a processor, the NSP in order to identify a plurality of service functions and an associated service function path for the plurality of service functions, identifying, by the processor, which security function or functions may be performed by each of the plurality of service functions on an NSP header to be generated for the NSP, requesting, by the processor, at least one key for securing at least part of the NSP header, receiving the at least one key on the communication interface, generating, by the processor, the NSP header for the NSP, securing, by the processor, the NSP header based on the at least one key, and sending, on the communication interface, the NSP with the NSP header to one of the plurality of service functions.

15 Claims, 5 Drawing Sheets

(51) Int. Cl.
*H04L 29/06* (2006.01)
*H04L 9/08* (2006.01)
*G06F 9/445* (2006.01)

(56) References Cited

U.S. PATENT DOCUMENTS

| | | | |
|---|---|---|---|
| 7,107,464 | B2 | 9/2006 | Shapira et al. |
| 7,509,496 | B2 * | 3/2009 | Skog .................. G06F 21/31 |
| | | | 705/56 |
| 7,562,213 | B1 | 7/2009 | Timms |
| 7,693,185 | B1 | 4/2010 | Brown et al. |
| 8,688,978 | B2 * | 4/2014 | Struik ........................ 713/160 |
| 2002/0176378 | A1 | 11/2002 | Hamilton et al. |
| 2004/0123159 | A1 | 6/2004 | Kerstens et al. |
| 2006/0048212 | A1 | 3/2006 | Tsuruoka et al. |
| 2010/0275008 | A1 | 10/2010 | Murrill |
| 2012/0096263 | A1 | 4/2012 | Shi et al. |
| 2013/0179584 | A1 | 7/2013 | Mizunashi et al. |
| 2013/0182843 | A1 | 7/2013 | Buckley et al. |
| 2015/0195267 | A1 * | 7/2015 | Miyata .................. H04L 63/08 |
| | | | 726/5 |
| 2015/0256454 | A1 | 9/2015 | Schliwa-Bertling et al. |
| 2015/0363209 | A1 | 12/2015 | Uchida |

OTHER PUBLICATIONS

Opendaylight Service Function Chaiining Use-Cases. Kumbhare et al. OpenDaylight SDN OpenFlow World Congress. Oct. 14, 2014.*

Bradner, S.; "Key words for use in RFCs to Indicate Requirement Levels", BCP 14, RFC 2119, Mar. 1997.
Frankel, S., et al; "The AES-CBC Cipher Algorithm and Its Use with IPsec", RFC 3602, Sep. 2003.
Gascon, David; Security in 802.15.4 and ZigBee networks: in Libellum World; Apr. 28, 2009.
Mattsson, J., et al; "Mikey-Ticket: Ticket-Based Modes of Key Distribution in Multimedia Internet KEYing (MIKEY)", RFC 6043, Mar. 2011.
McGrew, D.; "An Interface and Algorithms for Authenticated Encryption", RFC 5116, Jan. 2008.
Network Working Group; J. Halpern; Service Function Chaining (SFC) Architecture draft-ietf-sfc-architecture-04; Jan. 12, 2015.
Network Working Group; A. Biggs: Key Management Service Architecture (draft-abiggs-saag-key-management-service-00); Nov. 17, 2014.
Network Working Group; J. Halpern; Service Function Chaining (SFC) Architecture (draft-ietf-sfc-architecture-07); Mar. 6, 2015.
Network Working Group; P. Quinn; Network Service Header (draft-quinn-sfc-nsh-07.txt); Feb. 24, 2015.
Neuman, C., et al; "The Kerberos Network Authentication Service (V5)", RFC 4120, Jul. 2005.
Quinn, P. et al; "Service Function Chaining (Problem Statement", draft-ietf-sfc-problem-statement-13, work in progress; Feb. 19, 2015.
Quinn, P. et al; "Service Function Chaining: Creating a Service Plane via Network Service Headers," Computer . vol. 47, No. 11, pp. 38,44, Nov. 2014.
Weis, B, et al; "The Group Domain of Interpretation", RFC 6407, Oct. 2011.

* cited by examiner

NETWORK SERVICE PACKET HEADER SECURITY

TECHNICAL FIELD

The present disclosure generally relates to network service packet header security.

RELATED APPLICATION INFORMATION

The present application claims priority from Indian Patent Application S/N 1375/CHE/2015 of Cisco Technologies Inc. filed 19 Mar. 2015.

BACKGROUND

Service function chaining (SFC) [see I-D.ietf-sfc-architecture at datatrackerietf.org/doc/draft-ietf-sfc-architecture-] involves steering traffic flows through a set of service functions (SFs) in a specific order. Examples of service functions (SFs) include a firewall instance, a video compression instance or another IP instance. Such an ordered list of service functions is called a Service Function Chain (SFC). The actual forwarding path used to realize an SFC is called the Service Function Path (SFP).

Network Service Headers (NSH) [see datatracker.ietf.org/doc/draft-ietf-sfc-nsh/] provide a mechanism to carry metadata between service functions. The NSH structure is defined in "I-D.ietf-sfc-nsh" which may be found at datatracker.ietf.org/doc/draft-ietf-sfc-nsh/. NSH data can be divided into two parts: (i) path information used to construct the chain; and (ii) metadata earning the information about the network packets being chained. An NSH contains metadata information that are added to a packet or frame and used to create a service plane. The packets and the NSH are then encapsulated in an outer header for transport. The service header is added by a service classification function, which is a device or application that determines which packets require servicing, and correspondingly which service path to follow to apply the appropriate service. NSH data is unauthenticated and unencrypted, forcing a service topology that requires security to use a transport encapsulation feat supports such security features (e.g.: IPsec).

BRIEF DESCRIPTION OF THE DRAWINGS

The present disclosure will be understood and appreciated more fully from fee following detailed description, taken in conjunction with, the drawings in which.

DESCRIPTION OF EXAMPLE EMBODIMENTS

Overview

Figure 1:
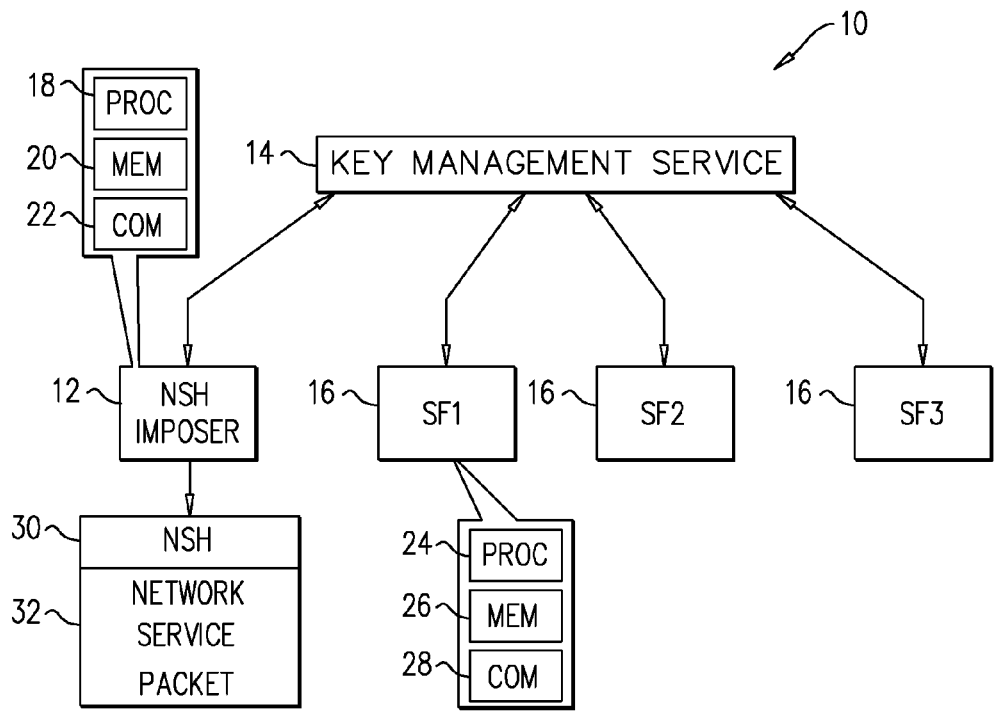
FIG. 1 shows an NSH service function chain security system constructed and operative in accordance with an embodiment of the present disclosure.

There is provided in accordance with an embodiment of the present disclosure a network service packet header security method including receiving a network service packet on a communication interface, analyzing, by a processor, the network service packet in order to identify a plurality of service functions and an associated service function path for the service functions, identifying, by the processor, which security function or functions may be performed by each of the service functions on a network service packet header to be generated for the network service packet, requesting, by the processor, at least one key for securing at least part of the network service packet header, receiving the at least one key by the communication interface, generating, by the processor, the network service packet header for the network service packet, securing, by the processor, the network service packet header based on the at least one key, and sending, on the communication interface, the network service packet with the network service packet header to one of the service functions.

There is also provided in accordance with another embodiment of the present disclosure a network service packet header security method including receiving, on a communication interface, a network service packet with a network service packet header, requesting, by a processor, at least one key used in seeming at least part of the network service packet header from a key management system, receiving, on the communication interface, the at least one key from the key management system, authenticating, by the processor, at least one authentication tag included in the network service packet header, and sending, on the communication interface, the network service packet with the network service packet header to a service function.

Encoded Versus Encrypted

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error collection mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims. Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipients) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different, and exclusive types of processing.

DETAILED DESCRIPTION

Reference is now made to FIG. 1, which shows a Network Service Header (NSH) service function chain security system 10 constructed and operative in accordance with an embodiment of the present disclosure. By way of introduction, Service Function Chaining (SEC) [I-D.ietf-sfc-architecture] removes the constraint of strict ordering of service functions (SFs) (sometimes known as service function nodes) and allows dynamic ordering of service functions. The service function path (SFP) could vary for different traffic audit is not generally possible to predetermine peer service functions in service function paths and pre-distribute credentials for security association between all possible combinations of peer service functions for authentication and encryption of NSH data. SFP may be unidirectional or bidirectional depending on the state requirements of the service functions. For example, unidirectional SFP is passed through a set of service functions in one direction only. SFP could span Data Centers, or across administrative domains. SFP based on subsequent classification could be different than the SFP determined based on initial classification.

The NSH service function chain security system 10 includes an NSH imposer 12, a key management service (KMS) 14 and a plurality of SFs 16, e.g.: SF1, SF2 and SF3, The NSH imposer 12 includes, or may be embedded in a device which includes, a processor 18, a memory 20 and a communication interface 22. The functioning of the NSH imposer 12 is described, in more detail below. The processor 18 is operative to perform processing functions including encryption, decryption, authentication tag creation and authentication, maintaining a sequence number, requesting a ticket, generating an NSH 30 (header) described in more detail below with reference to FIGS. 2-9. The memory 20 is operative to store data used by the processor 18. The communication interface 22 is operative to send and/or receive network packets 32, tickets, keys, encryption algorithms, authentication tag generation algorithms and authentication algorithms and any other data (none of which are depicted in FIG. 1), as will be described in more detail below with reference to FIGS. 2-9.

Each SF 16 includes, or may be embedded in a device which includes, a processor 24, a memory 26 and a communication interface 28. The processor 24 is operative to perform processing functions including encryption, decryption, authentication tag creation and authentication, updating NSH data, as will be described in more detail below with reference to FIGS. 2-9. The memory 26 is operative to store data used by the processor 24. The communication interface 28 is operative to send and/or receive network packets 32, tickets, keys, encryption algorithms, authentication tag generation algorithms and authentication algorithms and any other data (none of which are depicted in FIG. 1), described in more detail below with reference to FIGS. 2-9.

The NSH imposer 12 generates the NSH (header) 30 for the incoming network service packets 32 and coordinates the various security issues with the KMS 14. The NSH imposer 12 imposes NSH which typically includes, but is not limited to including, Path-id, service index and metadata. The NSH imposer 12 is a classifier function in a network.

The NSH imposer 12 receives the necessary key or keys from the KMS 14 and secures the NSH 30. The term "securing", in all grammatical forms, as used in the specification or claims, is defined as encrypting and/or generating an authentication tag for at least some of the data of the NSH 30. Securing the NSH 30 is described in more detail below. However, in overview, securing the NSH 30 typically involves encrypting part of the NSH and/or typically generating one or two authentication tags, for example, but not limned to, MACs (Message Authentication Codes) for at least part of the NSH 30. It may be appreciated by those ordinarily stalled in the art that one or more of fee MAC(s) may be replaced by a digital signature or signatures. The system 10 does not preclude generating more than two authentication tags per NSH 30.

A key management service is used in the Group Domain of Interpretation (GDOI) protocol specified in RFC6407 of the Internet Engineering Task Force (IETF), the Multimedia Internet KEYing (MIKEY) specification which describes a key management scheme for real-time applications specified in RFC6043 of the IETF and end-to-end encryption key management service [I-D.abiggs-saag-key-management-service]. It may be appreciated that the key management service 14 could be based on an existing key management system. Alternatively, tire key management service 14 may be implemented to include the functionality described herein without being based on an existing key management system.

The keys for encryption/decryption and verifying/generating authentication tags are supplied to the various SFs 16 by the key management service 14 based on security needs as determined by the NSH imposer 12. The function chain security system 10 typically enables keys and other security information to be propagated to SFs 16 authorized by the NSH imposer 12 as and when needed and generally avoids the use of pair-wise symmetric keys (individual "personal" keys unique to each SF 16). The SFs 16 do not have to share any credentials. Typically, the SFs 16 trust a third party, the KMS 14, with which the SFs 16 have or can establish shared credentials. The pre-established trust relations are used to establish a security association between SFs 16. The key material is typically unique for each SFP so that only the authorized SFs 16 participating in the SFP can act on the data of the NSH 30.

A KMS based on symmetric keys has particular advantages, as symmetric key algorithms are generally much less computationally intensive than a symmetric key algorithms and the size of cipher-test generated using a symmetric key algorithm is smaller compared to the cipher-text generated using an asymmetric encryption algorithm. Systems based on a KMS typically use a signaling mechanism that allows peers to retrieve other peers' dynamic credential. A convenient way to implement such a signaling scheme is to use a ticket concept, similar to that in Kerberos, specified in RFC4120 of the IETF, to identify and deliver keys. The ticket can be forwarded in the data of the NSH 30. The NSH imposer 12 requests a ticket from the KMS 14 and the NSH imposer 12 sends the ticket in the NSH 30. The SF 16 in the SFP obtains the ticket from NSH 30 and requests the KMS 14 to provide the key material associated with the ticket. If the SF 16 is authorized then the KMS returns the corresponding keys. In some embodiments the keys may be delivered to the SFs 16 without having to receive a request from the SFs 16. Ticket and key delivery handling is described in more detail with reference to FIGS. 2-9.

It should be noted that the KMS 14 may introduce a single point of (security) failure. The security requirements on the implementation and protection of the KMS 14 may therefore, in high-security applications, be more or less equivalent to the requirements of an AAA (Authentication, Authorization, and Accounting) server or a Certificate Authority (CA).

It should be noted that the KMS 14 may be provided without using a ticket, for example, but not limited to, using the mechanism of GDOL, specified in RFC 6407 of the IETF, for sharing keys. In GDOI, a key identifier is typically sent with the keys for the SFs 16 to identify the correct key. The key identifier may also be included in the ticket or some other data element which substitutes for a ticket.

Key management, retrieval and distribution are described in more detail below.

Figure 2:
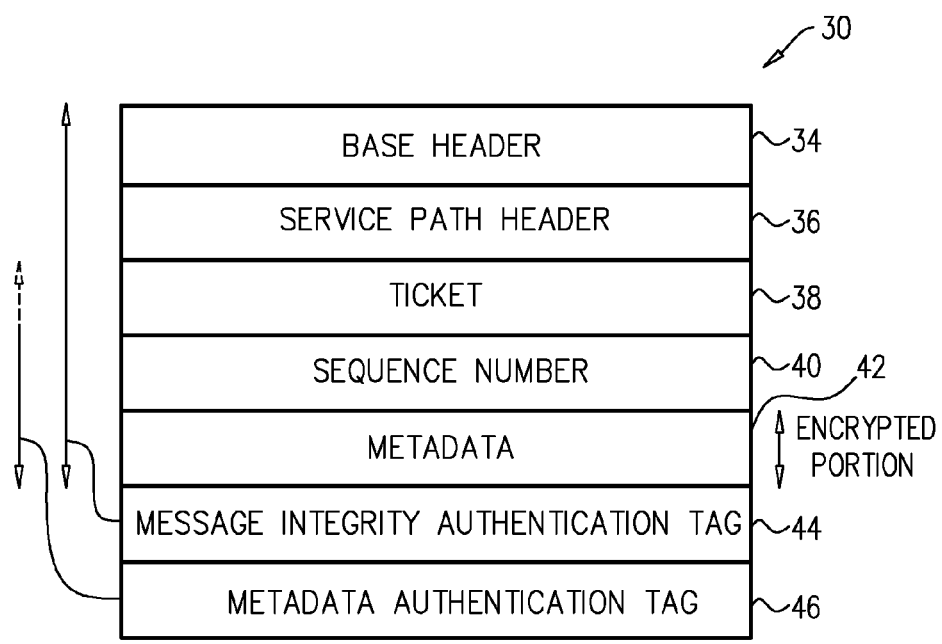
FIG. 2 shows a security enhanced NSH Header constructed and operative in accordance with the system of FIG. 1.

Reference is now made to FIG. 2, which shows a security enhanced NSH (header) 30 constructed and operative in accordance with the system 10 of FIG. 1. The security enhanced NSH (header) 30 typically includes, but is not limited to including, a base header 34, a service path header 36, a ticket 38, a sequence number 40, metadata 42, a message integrity authentication tag 44 and a metadata authentication tag 46.

The base header 34 typically provides information about service header and payload protocol. The service path header 36 typically provides path identification and location within a path.

The ticket 38 is typically a variable length object used to identify and deliver keys over an untrusted network to SFs, as for example, the SFs 16 of FIG. 1. The ticket 38 could be self-contained (typically encrypted by the KMS 14 for decryption by the KMS 14) with keys encoded/included in the ticket 38 or with a handle or link to some internal data structure within the KMS 14. The ticket 38 may optionally include information to identify the keys (received from the KMS 14) used to secure the NSH 30 including the ticket 38. The generation and use of the ticket 38 is described in more detail below. It should be noted that a ticket is not necessary (or may be replaced by another data element, as described above) if a non-ticket based key management service is used.

The sequence number 40 is typically provided for replay protection. The sequence number 40 is typically an unsigned counter value that increases by one for each NSH 30 created and sent from the NSH imposer 12 of FIG. 1, i.e., a per-ticket packet sequence number. In other words, the sequence number 40 is typically incremented every time an NSH 30 is included by the NSH imposer 12 in a network packet 32. The sequence number 40 is typically not incremented if an existing NSH 30 is being updated. The size of the sequence number 40 may be any suitable size, for example, but not limited to, 32 or 64 bits.

The NSH imposer 12 maintains a counter that is typically initialized to 0 when a new ticket 38 is to be used. The NSH imposer 12 increments the counter for the ticket 38 and inserts the counter value into the sequence number 40 field of the NSH 30. Thus the first NSH 30 sent using a given ticket 38 typically includes a sequence number of 1. The NSH imposer 12 checks to ensure that the counter has not cycled before inserting the new value in the sequence number 40 field. In other words, the NSH imposer 12 typically does not send a packet 32 on a ticket 38 if doing so would cause the sequence number 40 to rollover. Sequence number counters of the participating nodes (e.g.: the NSH imposer 12 and the SFs 16) may be reset by establishing a new ticker 38 prior to the transmission of the $2^X$ packet (where X is the size of the sequence number in bits) of the NSH 30 for a particular ticket 38.

The message integrity authentication tag 44 is typically a MAC or digital signature of the base header 34, the service path header 36, the ticket 38, the sequence number 40 and the metadata 42. The metadata authentication tag 46 is typically a MAC or digital signature of the sequence number 40 and the metadata 42, and optionally the ticket 38.

It should be noted that for the sake of simplicity each tag 44, 46 may be referred to below as being prepared as a MAC. However, it will be appreciated that a digital signature could be substituted for the MAC.

The metadata 42 may be partially or wholly encrypted. Alternatively, the metadata 42 may be left unencrypted, i.e.: in the clear. When the metadata 42 is encrypted, the metadata 42 may be encrypted using any suitable encryption algorithm, for example, but not limited to, AES or Triple-DES.

A randomly generated Initialization Vector (IV) may prevent generation of identical cipher-texts from network packets 32 which have identical metadata. Use of an IV in Advanced Encryption Standard (AES) with Cipher Block Chaining (CBC) is explained in RFC3602 of the IETF.

The encryption of the metadata 42 is typically performed and/or authentication tag(s) 44,46 typically generated by the NSH imposer 12 when the NSH 30 is generated. When the network packet 32 is received by the SFs 16, the authentication tag(s) 44,46 in the NSH 30 are authenticated and the metadata 42 is decrypted as necessary and in accordance with the keys supplied to the different SFs 16. It will explained in more detail below that not all SFs 16 receive all fee keys based on the security decision determined by the NSH imposer 12. If metadata 42 in the NSH 30 is updated by one of the SFs 16, the metadata 42 (or part thereof) is re-encrypted and the authentication tags 44, 46 are typically regenerated. If another field of the NSH 30 which is not authenticated by the metadata authentication tag 46 is updated, then only the message integrity authentication tag 44 is typically regenerated.

The security decision determined by the NSH imposer 12 is typically based on rules established by a network administrator. By way of example only, a network administrator may provide a rule that certain types of NSH metadata 42, such as subscriber identifier and application identifier, may be decrypted for reading by certain service functions 16, such as video compressors in the SFP, but fee same service functions are not authorized to modify the same types of NSH metadata 42.

It should be noted that the authentication tag(s) 44, 46 are typically generated after fee metadata 42 is encrypted (if encryption is performed). However, it will be appreciated by those of ordinary skill in the art that the authentication tag(s) 44, 46 may be generated prior to encrypting the metadata 42. The authentication tag(s) 44, 46 are typically generated using any suitable cryptographic integrity transform (for example, but not limited to, HMAC, CMAC) or a digital signature method.

The keys used for fee decryption and the generation/authentication of the authentication tag(s) 44, 46 are typically different but in some embodiments could be the same. The keys used for generation of each of the authentication tag(s) 44, 46 (if two are included in the NSH 30) are typically different, but could be the same in some embodiments.

The Authenticated Encryption with Associated Data (AEAD) algorithm may be employed to perform both authentication and encryption, for example, but not limited to, Galois/Counter Mode (GCM), where the authenticated regions are inserted into AAD (additional authenticated data). AAD is an input to the AEAD algorithm; it is data that is not encrypted, but does modify the authentication tag that is generated. That way, unencrypted data may be included along with the encrypted data; if the unencrypted data is modified, the decryptor will compute a different tag, and so the decryptor knows that the message was modified.

If the AEAD algorithm is used: (a) the Initialization Vector field may carry a nonce. By way of example only, the nonce may be formatted as a fixed field followed by a counter field. For each fixed encryption key, the length of each of these fields, and thus the length of the nonce, may be fixed. Implementations may support 12-octet nonces, by way of example only, in which the counter field is four octets long. The counter fields of successive nonces may form a monotonically increasing sequence, when the counter fields are regarded as unsigned integers in network byte order. The length of the counter field typically remains constant for all nonces that are generated for a given encryption device. The counter field is typically equal to zero for the first nonce, and incremented by one for each successive nonce that is generated. However, any particular counter value may be skipped over, and left out of the sequence of values that are used. For example, an application could choose to skip the initial counter=0 value, and set the counter field of the initial nonce to 1. Thus, $2^{(8*C)}$ nonces may be generated when the counter field is C octets in length. The fixed field typically remains constant for all nonces that are generated for a given encryption device. If different devices are performing encryption with a single key, then each distinct device typically uses a distinct fixed field, to ensure the uniqueness of the nonces. Thus, $2^{(8*F)}$ distinct encrypters can share a key when the Fixed field is F octets in length; (b) AAD is typically the entire NSH 30 data excluding the metadata 42 to be encrypted and the nonce value.

If one or more SFs 16 in the SFP are authorized to validate the message integrity of the NSH 30 and update the unencrypted NSH data but not decrypt the encrypted metadata then the AEAD algorithm is typically not used (as AEAD typically provides for encryption and all the authentication together) and these SFs 16 are typically given access to the key for generating the message integrity authentication tag 44.

New TLVs (TLV=type-length-value) are typically defined to carry the ticket 38, sequence number 40, encrypted metadata 42 and authentication tags 44, 46. Exemplary TLVs are described with reference to FIGS. 6-9. If one of the SFs 16 identifies a missing TLV in the NSH 30, the SF 16 may determine that the authenticity of the NSH 30 cannot be ascertained and the packet 32 may be discarded.

It should be noted that the NSH service function chain security system 10 is described with reference 10 an NSH (header). However, it will be appreciated that the security features described herein may be implemented in any suitable non-NSH header for a network service packet.

Figure 3:
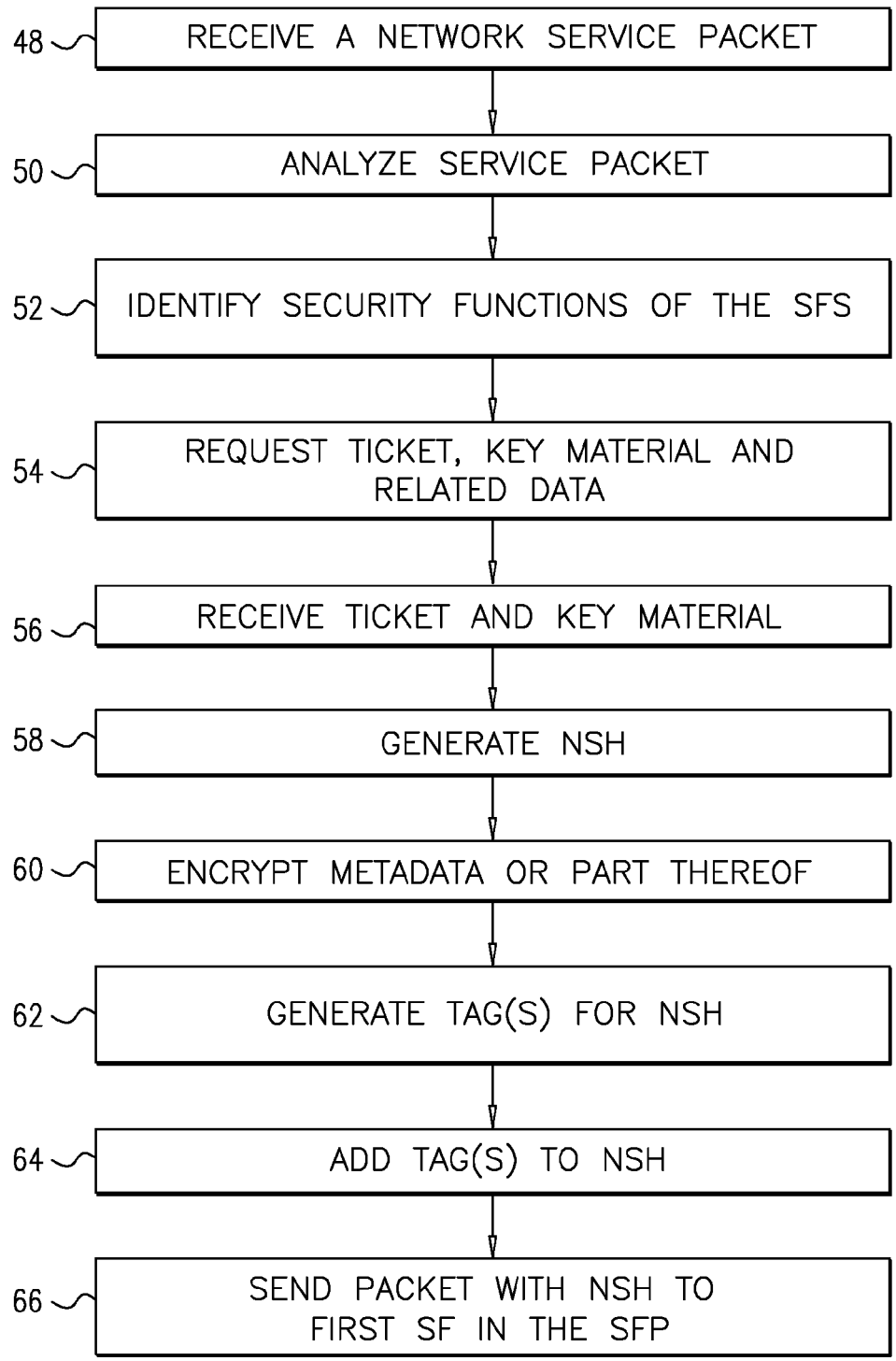
FIG. 3 is a flowchart showing exemplary steps performed by an NSH imposer in the system of FIG. 1.

Reference is now made to FIG. 3, which is a flowchart showing exemplary steps performed by the NSH imposer 12 in the system 10 of FIG. 1. The NSH imposer 12 receives a network service packet 32 (block 48). The NSH imposer 12 analyzes the network service packet 32 in order to identity a plurality of the SFs 16 and an associated service function path for the SFs 16 (block 50). The NSH imposer 12 performs classification on the network service packet 32 to determine the service function path. An example of classification is described in //tools.ietf.org/html/draft-ietf-sfc-architecture-07#section-4.7 which describes that the granularity of initial classification is determined by the capabilities of the classifier and the requirements of the SFC policy. For instance, classification might be relatively coarse, e.g., substantially all packets from a certain port are subject to an SFC policy X and directed into an SFP A, or quite granular, e.g., substantially all packets matching a 5-tuple are subject to an SFC policy Y and directed into an SFP B. As a consequence of the classification decision, the appropriate SFC encapsulation is imposed on the data, and a suitable SFP is selected and/or created. Classification results in attaching the traffic to a specific SFP.

The NSH imposer 12 identifies which security function or functions may be performed by each of the SFs 16 on an NSH 30 to be generated for the network service packet 32 (block 52). For example, the NSH imposer 12 may identify the set of SFs 16 in the service function path that would encrypt, decrypt, modify and re-encrypt fee NSH metadata 42. It should be noted that one or more the SFs 16 may only perform a portion of the above mentioned operations (encrypt, decrypt, modify and re-encrypt) and different SFs 16 in fee same SFP may perform different operations.

An SF 16 may be entitled to read, but not write, into encrypted metadata 42, an SF 16 may be entitled to read or write into encrypted metadata 42, an SF 16 may be entitled to read, but not write unencrypted metadata 42 and an SF 16 may be entitled to read and write unencrypted metadata 42. The different SF entitlements may be controlled by controlling the encryption and authentication keys supplied to the SFs 16 by the KMS 14 as will be explained in more detail below.

If the NSH imposer 12 identifies that a subset of the SFs 16 (or that even one SF 16) may decrypt the NSH 30 data but not modify the data, the NSH imposer 12 may inform the KMS 14 to provide two authentication keys (one for generating the message integrity authentication tag 44 and one for generating the metadata authentication tag 46). So for example, if the NSH imposer 12 identifies that SF2 should read, but not modify the metadata 42, SF2 will only be allowed to obtain the key for decrypting the metadata 42 and for authenticating the message integrity authentication tag 44 but not for authenticating the metadata authentication tag 46. Therefore, if SF2 changes the metadata 42, SF2 cannot update the metadata authentication tag 46 and the modification of the metadata 42 may be identified by another SF 16. The NSH imposer 12 could know that a certain Service Function is authorized to decrypt and look into NSH metadata but not modify metadata. For example, the NSH imposer 12 may know that NSH metadata like subscriber identifier, application identifier added by it could be decrypted by service functions like video compressor in the SFP but not authorized to modify the NSH metadata.

The NSH imposer 12 requests a ticket 38 and key material including at least one key and (encryption/authentication) algorithm(s) for securing at least part of the NSH 30 from the KMS 14. The NSH imposer 12 also conveys to the KMS 14 the identities of SFs 16 authorized to receive the cryptographic session information (keys, algorithms) associated with the ticket 38 from the KMS 14 (block 54). Each SF 16 is typically referenced by the NSH imposer 12 to the KMS 14 using an identifier that is unique within an SF-enabled domain. The KMS 14 creates the keys and controls key distribution to the SFs 16, as will be described in more detail with reference to FIG. 4.

If the request from the NSH imposer 12 is approved by the KMS 14, the KMS 14 generates a ticket 38 and keys for message authentication and encryption (if encryption is to be performed). The KMS 14 conveys the ticket 38 and key material along with negotiated encryption (if encryption is to be performed) and authentication algorithms in a response message to the NSH imposer 12. The encryption and authentication algorithms may either be negotiated between the NSH imposer 12 and the KMS 14 or determined by the KMS 14 and conveyed to the NSH imposer 12. It should be noted that the KMS 14 may send the actual algorithm(s) in the response message or just state which algorithm(s) is to be used for encryption, decryption and authentication in the response message.

The ticket 38 may include key information (the actual key or keys) or key generation information. In either case, during generation of the ticket 38 by the KMS 14, the ticket 38 may be encrypted by the KMS 14 (for future decryption by the KMS 14) using a secret key which is not known to the SFs 16 and typically not known to the NSH imposer 12. The NSH imposer 12 is operative to receive, from the KMS 14, the ticket 38 and key material including the key or keys for securing at least part of the NSH 30 (block 56).

The NSH imposer 12 generates and secures the NSH 30 based on the received key or keys (block 58). The NSH imposer 12 typically includes the received ticket 38 and the sequence number 40 in the NSH 30, optionally encrypts at least part of the metadata 42 of the NSH 30 (block 60) and generates one or two authentication tag(s) (e.g.: based on CMAC or HMAC or any suitable authentication algorithm) (block 62) and includes the authentication tags(s) in the NSH 30 (block 64). One of the authentication tags may correspond to the message integrity authentication tag 44 described above (which typically authenticates all tire data of the NSH 30 including the metadata 42 of the NSH 30 and header fields 34, 36. The other authentication tag may correspond to the metadata authentication tag 46 described above which authenticates the metadata 42 of the NSH 30 (and possibly some more data of the NSH 30) but does not authenticate a header field or header fields 34, 36 of the NSH 30 (e.g.: the base header 34 and/or service path header 36 of the NSH 30).

The NSH imposer 12 may encrypt all the NSH metadata 42 or only a subset of the NSH metadata 42 i.e., encrypted and unencrypted metadata 42 may be carried simultaneously in the NSH 30. Alternatively, none of the NSH metadata 42 may be encrypted. It NSH 30 encryption desired, encryption is typically performed prior to the authentication tags 44, 46 being generated. Tins older of processing facilitates rapid detection and rejection of bogus network packets 32 by the receiver prior to decrypting the metadata 42 and hence potentially reduces the impact of denial of service (DoS) attacks. The NSH imposer 12 sends the network service packet 32 with the NSH 30 to the first SF 16 in the SFP (block 66).

Figure 4:
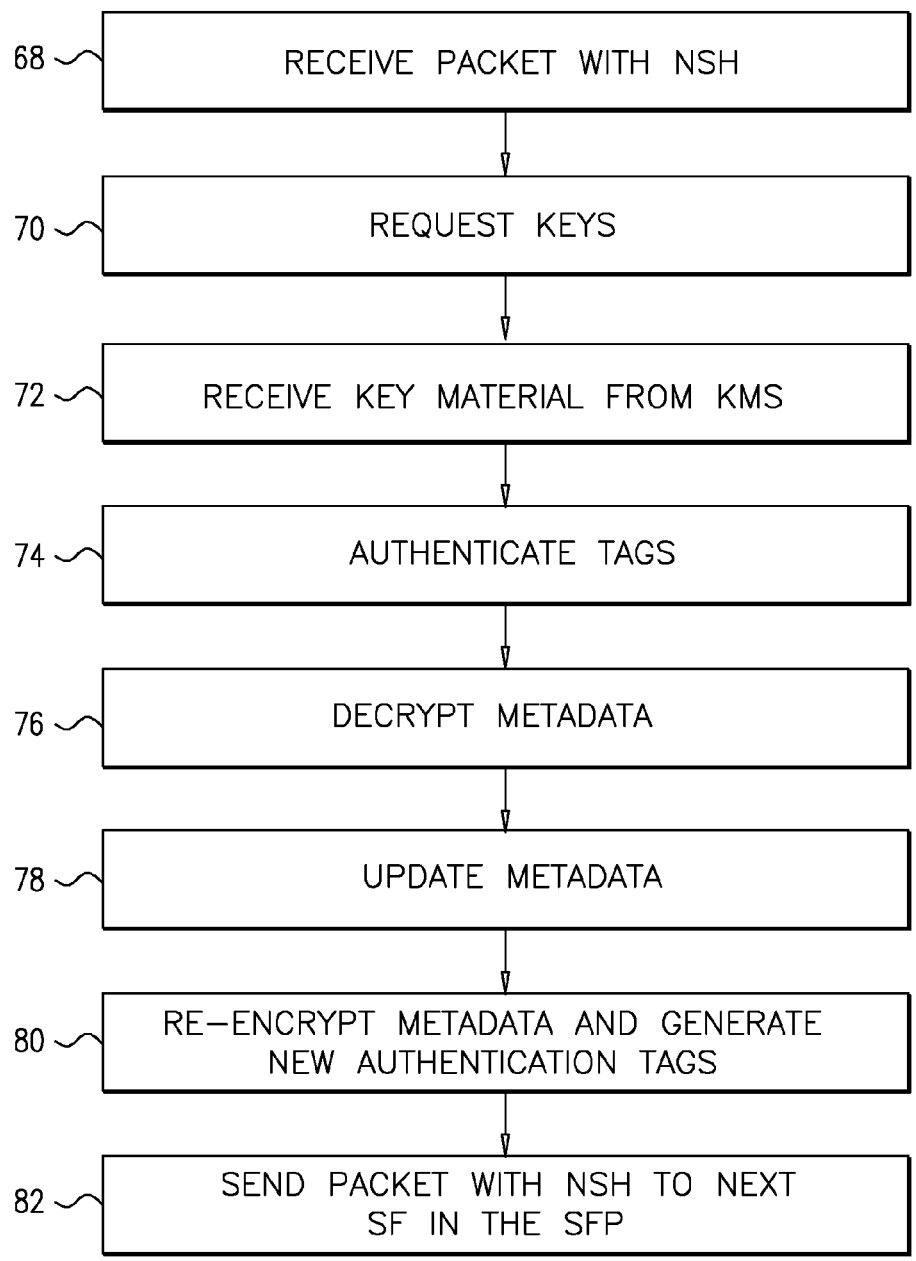
FIG. 4 is a flowchart showing exemplary steps performed by a Service Function in the system of FIG. 1.

Reference is now made to FIG. 4, which is a flowchart showing exemplary steps performed by the SFs 16 in the system 10 of FIG. 1. Each SF 16 in the SFP receives the network service packet 32 with the NSH 30 from the NSH imposer 12 or from another SF 16 depending upon the position of the receiving SF 16 in the SFP (block 68). When the SF 16 receives the NSH 30, the SF 16 typically first ensures that all TLVs required tor NSH 30 data authentication are present. The SF 16 may discard the NSH 30 if a TLV or TLVs are absent or if the sequence number 40 is invalid.

Sequence number 40 validation is typically performed to prevent a replay attack. Processing of the sequence number 40 field is at the discretion of the SF 16. The SF 16 may validate that the sequence number 40 to determine that sequence number 40 does not duplicate the sequence number 40 of any other NSH 30 received during the life of the ticket 38. If the TLVs are present and the sequence number 40 is valid (if the sequence number 40 has been checked), the SF 16 continues with data validation.

Each SF 16 in the SFP forwards the ticket 38 signaled in the NSH 30 to the KMS 14 and requests the KMS 14 to provide the cryptographic session details (including key(s) used in securing at least part of the NSH 30 and algorithm(s) (authentication algorithms and optionally encryption/decryption algorithms)) (block 70). Alternatively, the KMS 14 may push the cryptographic session information to the authorized SFs 16 in the SFP implicitly. The SFs 16 match the appropriate keys pushed from the KMS 14 using information in the ticket 38 described in more detail below. The cryptographic session information is typically pushed to the SFs 16 at the same time that the ticket 38 and keys are sent to the NSH imposer 12.

When service functions in the SFP forward the ticket 38 signaled in the NSH 30 to the KMS 14 and request the KMS 14 to provide the cryptographic session details, the request may be. processed by the KMS 14 based on a handle to key material included in the ticket 38. Alternatively, the ticket 38 may include encrypted key information or encrypted key generation information. The SF 16 sends the ticket 38 including the encrypted information to the KMS 14 in order for the KMS 14 to decrypt the encrypted key or the encrypted key information and generate the key or keys.

Prior to the KMS 14 sending the cryptographic session details to an SF, the SF 16 is authenticated and the ticket 38 is checked for validity by the KMS 14 (when the ticket 38 is sent by the SF 16 to the KMS 14). Authentication of the SFs 16 by the KMS 14 may be via any suitable authentication mechanism, for example, but not limited to, a certificate based mechanism whereby each SF 16 has a certificate which is presented to the KMS 14 for authentication or via providing credentials such as an ID and secret key (e.g.: by providing an HMAC of the ID with the secret key).

After successful authentication and ticket validation (if relevant), the KMS 14 conveys the cryptographic session information to service functions that were authorized by the NSH imposer 12. Keys are typically transferred from the KMS 14 to the relevant authorized service functions via a secure channel.

The SF 16 is operative to receive the cryptographic session information (including the key(s) and algorithms) from the KMS 14 (block 72). It should be noted that the KMS 14 may send fee actual algorithm(s) in the response message or just state which algorithm(s) is to be used for encryption, decryption and authentication in the response message.

The interaction between the Service functions and the KMS 14 may be based on Transport Layer Security (TLS) with a ciphersuite offering confidentiality protection. The encryption and authentication keys are typically not transmitted in clear for security reasons.

The ticket 38 may allow the SF 16 to select the appropriate key material for use in decryption and/or authentication. For example, different keys for different NSHs 30 may be pushed or retrieved from the KMS 14. Therefore, the SF 16 may need to distinguish between the different keys and this extinguishing is performed based on information included in the ticket 38 which is included in the NSH 30.

The SF 16 is typically operative to authenticate the authentication tag(s) 44, 46 included in the NSH 30 according to the number of keys available to the SF 16 from the KMS 14 (block 74) as discussed above with reference to FIGS. 2 and 3. The SF 16 calculates the message integrity for the entire NSH 30 data using the MAC key and HMAC or CMAC algorithm obtained from the KMS 14 for the ticket 38 being carried in NSH 30. If a digital signature(s) is used instead of a MAC(s), the digital signature(s) is authenticated using the key(s) provided by the KMS 14. If the value of the newly generated digest is identical to the one in the NSH 30, the SF 16 has ascertained that the header has not been tampered with and validation succeeds. Otherwise, the NSH 30 is typically discarded. The metadata authentication tag 46 may be validated by the SF 16 in a similar way. If any of the NSH 30 values are invalid then the NSH 30 may be discarded.

After NSH 30 data validation is complete, the SF 16 decrypts the metadata 42 (if encrypted, even partially) using the supplied decryption key (if the SF 16 has been supplied with the decryption key) and the decryption algorithm obtained from the KMS 14 for the ticket 38 in NSH 30 (block 76). As mentioned above, the encrypted metadata 42 which may be part of, or all of, the metadata 42 of the NSH 30. If the AEAD algorithm is used then it has only a single output, either a plaintext (if authenticated) or a special symbol FAIL (if not authenticated).

If the metadata 42 is now in the clear, the SF 16 may read and update the metadata 42 (block 78). Updating the metadata 42 is typically only performed by the SFs 16 having the key to generate the metadata authentication tag 46.

If the metadata 42 was decrypted, the SF re-encrypts the metadata 42. If SF 16 updates the NSH 30 (including updating at least part of the metadata 42), the SF 16 typically generates one or more new authentication tags for the NSH 30 to replace the existing authentication tags 44, 46 (generally after decrypting, updating and re-encrypting the metadata 42) to maintain message integrity of the NSH 30 for subsequent validation by other SFs 16 in the SFP (block 80). One of the newly generated authentication tags may correspond to the message integrity authentication tag 44 described above (which typically authenticates all tire data of the NSH 30 including the metadata 42 of the NSH 30 and header fields 34, 36). The other newly generated authentication tag may correspond to the metadata authentication tag 46 described above which authenticates the metadata 42 of the NSH 30 (and possibly some more data of the NSH 30) but does not authenticate a header field or header fields 34, 36 of the NSH 30 (e.g.: base header 34 and/or service path header 36 of the NSH 30). The SF 16 which updates tire NSH 30 is typically provided with both the authentication keys (one for the message integrity authentication tag 44 and one for the metadata authentication tag 46). The tags authenticating data which has been updated are typically regenerated. Thus, if the metadata 42 was updated then authentication tags 44, 46 are typically regenerated. If none of the TLVs authenticated by the metadata authentication tag 46 were updated then the metadata authentication tag 46 does not need to be regenerated and replaced. The newly generated tag(s) 44, 46 are included in the NSH 30 by the SF 16 in place of the tag(s) 44, 46. The SF 16 typically sends the network service packet 32 with the NSH 30 to the next SF in the SFP (block 82).

Reclassification and branching in the service path typically involves two steps. First, if there is reclassification and branching, the SF 16 at which reclassification happens could be treated like a new NSH imposer. Second, the new NSH imposer requests new keys and a new ticket 38 from the KMS 14 and provides the identities of the SFs 16 in the new service function path authorized to receive the key material associated with the new ticket 38. For subsequent network packets 32 of the SFP, the new ticket 38 will be conveyed in the NSH 30 data, and the NSH 30 data will, be integrity protected using the new MAC key and NSH metadata 42 encrypted, using the new ENC key.

Figure 5:
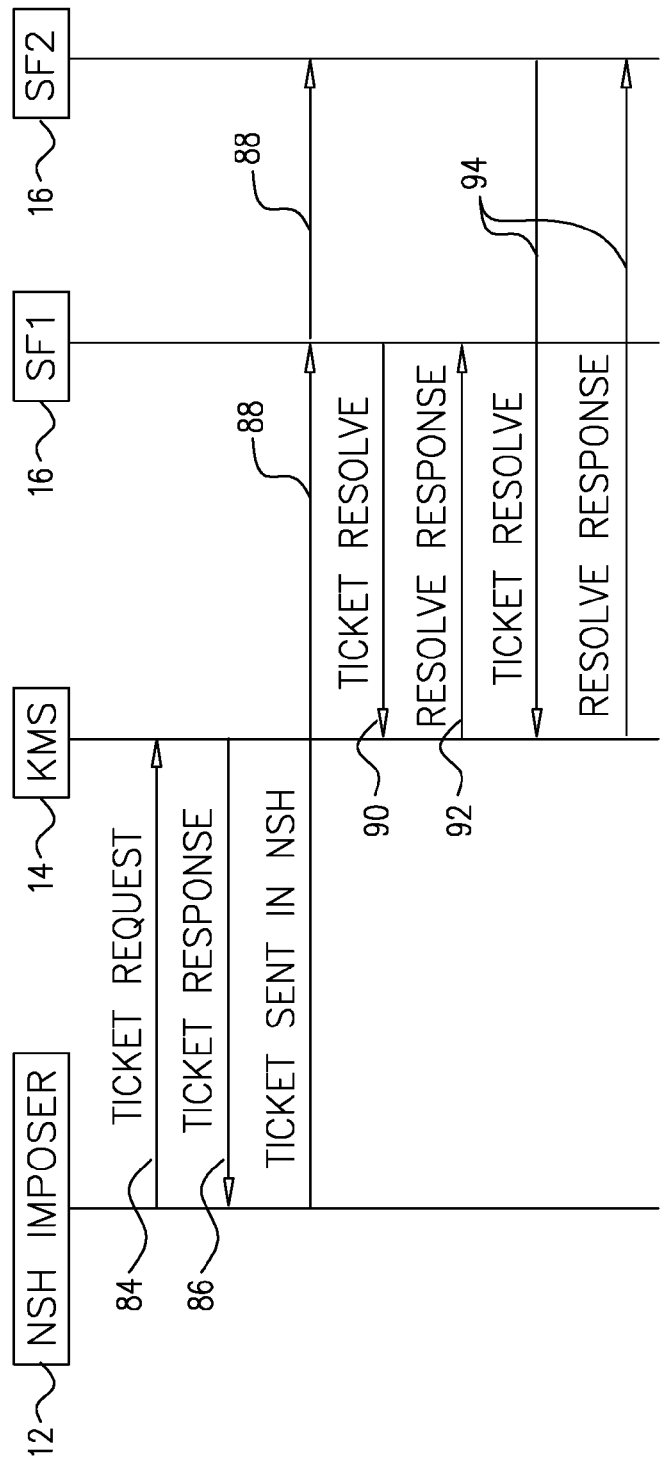
FIG. 5 shows information flow in the system of FIG. 1.
Figure 6:
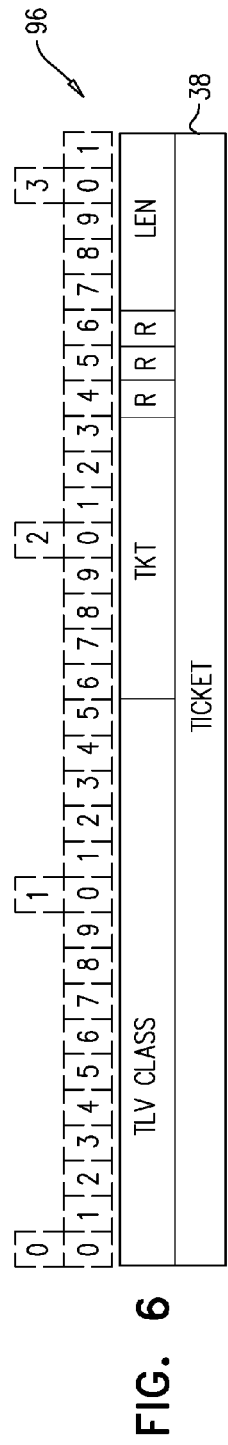
FIGS. 6-9 show various exemplary fields in the security enhanced NSH Header of FIG. 2.
Figure 7:
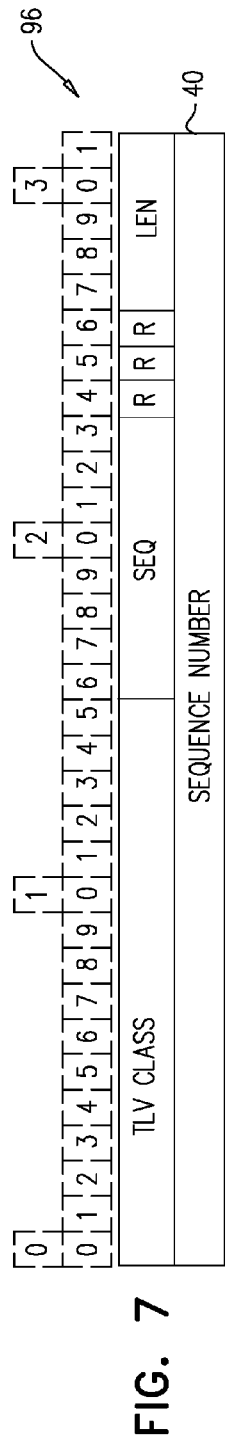

Reference is now made to FIG. 5, which shows information flow in the system 10 of FIG. 1. FIG. 5 shows an example of the NSH imposer 12 requesting keys and the ticket 38 from the KMS 14 in a request message (arrow 84). The request message includes identifiers of SF1 and SF2 authorized to receive the key material associated with the ticket 38. The KMS 14 returns the encryption key, authentication key(s) and the ticket 38 in a response message (arrow 86). The NSH imposer 12 includes the ticket 38 in the NSH 30 data and sends the network packet 32 with the NSH 30 to SF1 and SF2 (arrows 88). SF1 in the SFP forwards the ticket 38 to the KMS 14 and requests the KMS 14 to provide the key material associated with the ticket 38 (in a ticket resolve request message) (arrow 90). If SF1 is authorized and the ticket 38 is valid then the KMS 14 retrieves/generates the keys and algorithms associated with the ticket 38 and conveys the keys and algorithms to the SF1 (in a resolve response message) (arrow 92). Similarly, SF2 retrieves the key material associated with the ticket 38 from the KMS 14 (arrows 94).

Figure 8:
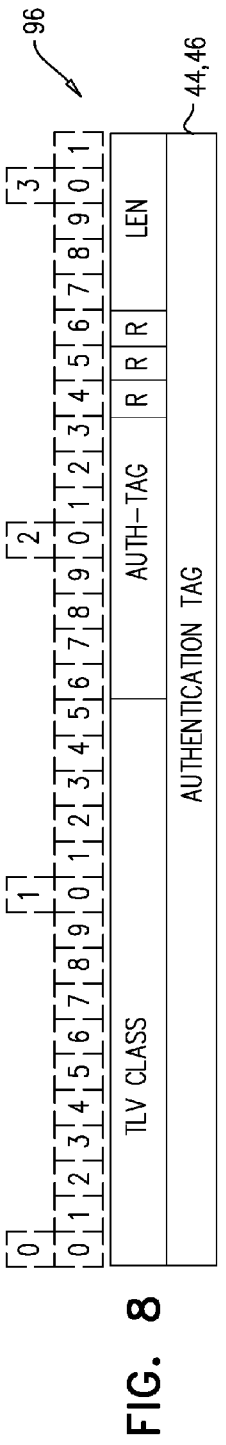
Figure 9:
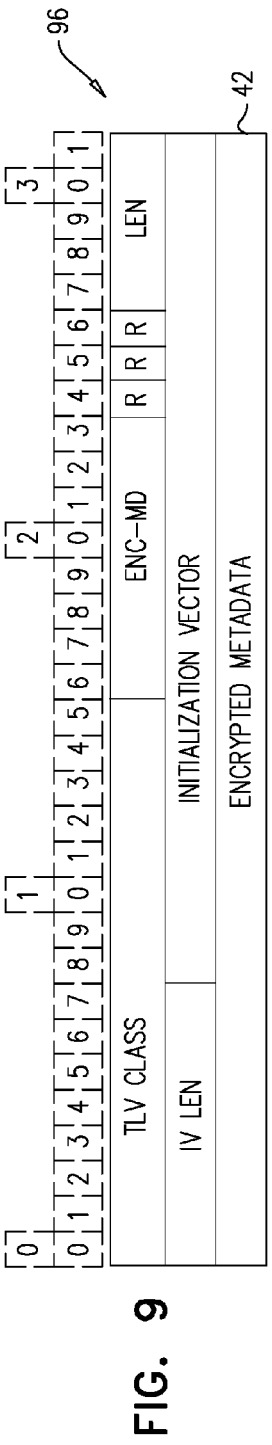

Reference is now made to FIGS. 6-9, which show various exemplary TLVs 96 in the security enhanced NSH 30 of FIG. 2. The first field in each of the TLVs 96 is "TLV class". The second field in each of the TLVs 96 is the "Type" field. The next 3 bits are reserved bits marked R and are typically set to zero. The next field in each of the TLVs 96 is the "Len" field and the final field in each of the TLVs 96 is the "variable metadata" field. The "TLV class" describes the scope of the "Type" field. The "Type" field describes the specific type of information being earned, e.g., TKT (for ticket), SEQ (for sequence number), AUTH-TAG (for authentication tag), ENC-MD (for encrypted metadata). The most significant bit of the Type field, "the C bit" indicates whether the TLV 96 is mandatory for the receiver to understand and process. The C bit in the Type field may be set to 1 indicating that the TLV 96 is mandatory for the receiver to understand and process. The "Len" field gives the length of the "variable metadata" field, typically in 4 byte words. The "variable metadata" may include data relevant to the TLV, for example, the data of the ticket 38 (in FIG. 6), the value of the sequence number 40 (in FIG. 7), the value of the message integrity authentication tag 44 or the metadata authentication tag 46 (is FIG. 8). In FIG. 9, the "variable metadata" field is shown including three sub-fields: (a) "IV Length" specifying the length of the initialization vector; (b) the value of the initialization vector; and (c) the encrypted metadata 42.

FIG. 8 shows an exemplary TLV 96 for the message integrity authentication tag 44 or the metadata authentication tag 46. If Authenticated Encryption with Associated Data (AEAD) algorithm, defined in RFC5116of the IETF, is used then there is no need to explicitly compute HMAC or CMAC and include this TLV 96. FIG. 9 shows an exemplary TLV 96 for the encrypted metadata 42.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be earned out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure, which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A network service packet header security method comprising:
   receiving a network service packet on a communication interface;
   analyzing, by a processor, the network service packet in order to identify a plurality of service functions and an associated service function path for the plurality of service functions;
   identifying, by the processor, which security function of functions may be performed, on a network service packet header to be generated for the network service packet, by each of the plurality of service functions;
   requesting, by the processor, at least one key for securing at least part of the network service packet header;
   receiving the at least one key on the communication interface;
   generating, by the processor, the network service packet header for the network service packet;
   securing, by the processor, the network service packet header based on the at least one key;
   generating a first authentication tag for at least part of the network service packet header;
   including the first authentication tag the network service packet header;
   generating a second authentication tag for the network service packet header;
   including the second authentication tag in the network service packet header, wherein: the network service packet header includes a base header field and a metadata field; the base header field and the metadata field are different fields in the network service packet header; the first authentication tag authenticates the metadata field of the network service packet header but not the base header field of the network service packet header; and the second authentication tag authenticates the metadata field and the base header field of the network service packet header; and
   sending, on the communication interface, the network service packet with the network service packet header to one of the plurality of service functions.

2. The method according to claim 1, further comprising: encrypting at least part of a metadata field of the network service packet header.

3. The method according to claim 1, further comprising; requesting a ticket trona a key management system; receiving the ticket from the key management system; and including the ticket in the network service packet header.

4. The method according to claim 3, wherein the ticket includes a handle to key material.

5. The method according to claim 3, wherein the ticket includes an encrypted key or encrypted generation information.

6. The method according to further claim 1, further comprising including a sequence number in the network service packet header.

7. A network service packet header security system comprising:
   a comunication interface to receive a network service packet;
   a processor to:
      analyze the network service packet in order to identify a plurality of service functions and an associated service function path for the plurality of service functions;
      identify which security function or functions may be performed, on a network service packet header to be generated for the network service packet, by each of the plurality of service functions;
      prepare a request for at least one key for securing at least part of the network service packet header, wherein:
   the communication interface is operative to: send the request to a key management system; and receive the at least one key from the key management system;
   the processor is operative to: generating the network service packet header for the network service packet; secure the network service packet header based on the at least one key; generate a first authentication tag for the at least part of the network service packet header; include the first authentication tag in the network service packet header; generate a second authentication tag for the network service packet header; include the second authentication tag in the network service packet header, wherein: the network service packet header includes a base header field and a metadata field; the base header field and the metadata field are different fields in the network service packet header; the first authentication tag authenticates the metadata field of the network service packet header but not the base header field of the network service packet header; and the second authentication tag authenticates the metadata field and the base header field of the network service packet header; and the communication interface is operative to send the network service packet with the network service packet header to one of the plurality of service functions.

8. A network service packet header security method comprising:

receiving, on a communication interface, a network service packet with a network service packet header;

requesting, by a processor, at least one key used in securing at least part of the network service packet header frrom a key management system;

receiving, on the communication interface, the at least one key from the key management system;

authenticating, by the processor, at least one authentication tag included in the network service packet header;

updating at least part of a metadata field of the network service packet header;

generating a first authentication tag for least part of the network service packet header including the updated metadata field;

generating a second authentication tag for the network service packet header; and including the first and second authentication tags in the network service packet header, wherein: the network service packet header includes a base header field and a metadata field; the base header field and the metadata field are different fields in the network service packet header; the first authentication tag authenticates the metadata field of the network service packet header but not the base header field of the network service packet header; and the second authentication tag authenticates the metadata field and the base header field of the network service packet header; and sending, on the communication interface, the network service packet with the network service packet header to a service function.

9. The method according to claim 8, further comprising decryting at least part of a metadata field of the network service packet header.

10. The metnod according to claim 8, further comprising decrypting at least part of the metadata field.

11. The method according to 8, wherein the network service packet header includes a ticket.

12. The method according to claim 11, wherein the ticket includes an encrypted key or encrypted key generation information, the method further comprising: sending the ticket to the key management system in order for the key management system to decrypt the encrypted key or the encrypted key generation information and generate the at least one key.

13. The method according to claim 11, wherein the ticket includes a handle to key material.

14. The method according to claim 8, wherein the network service packet header includes a sequence number.

15. A network service packet header security system comprising:

a communication interface to receive a file network service packet with a network service packet header;

a processor to generate a request for at least one key for securing at least part of the network service packet header from a key management system, wherein:

the communication interface is operative to receive the at least one key from the key management system;

the processor is operative to authenticate at least part of the network service packet header; update at least part of a metadata field of the network service packet header; generate a first authentication tag for at least part of the network service packet header including the updated metadata field; generate a second authentication tag for the network service packet header; and include the first and second authentication tags in the network service packet header, wherein: the network service packet header includes a base header field and a metadata field; the base header field and the metadata field are different fields in the network service packet header; the first authentcation tag authenticates the metadata field of the network service packet header but not the base header field of the network service packet header; and the second authentication tag authenticates the metadata field and the base header field of the network service packet header, and the communication interface is operative to send the network service packet with the network service packet header to a service function.

* * * * *

UNITED STATES PATENT AND TRADEMARK OFFICE
CERTIFICATE OF CORRECTION

PATENT NO. : 9,912,480 B2
APPLICATION NO. : 15/442722
DATED : March 6, 2018
INVENTOR(S) : Quinn et al.

Page 1 of 4

It is certified that error appears in the above-identified patent and that said Letters Patent is hereby corrected as shown below:

On the Title Page

On Page 2, Column 1, Other Publications, Line 1, "Chaiining" to read as -- Chaining --.

In the Specification

Column 1, Lines 9-10, below "Related Application Information" insert -- The present application is a continuation of US application number 14/726,534, filed on 31 May 2015, now patent number 9,621,520 which is incorporated herein in its entirety by reference. --.

Column 1, Line 17, "datatrackerietf" to read as -- datatracker.ietf --.

Column 1, Line 17, "architecture-" to read as -- architecture --.

Column 1, Line 30, "earning" to read as -- carrying --.

Column 1, Line 40, "feat" to read as -- that --.

Column 1, Line 46, "fee" to read as -- the --.

Column 1, Line 47, "with," to read as -- with --.

Column 2, Line 53, "collection" to read as -- correction --.

Column 3, Line 27, "different," to read as -- different --.

Column 3, Line 36, "SEC" to read as -- SFC --.

Column 3, Line 41, "audit" to read as -- and it --.

Signed and Sealed this
Twenty-eighth Day of August, 2018

Andrei Iancu
*Director of the United States Patent and Trademark Office*

CERTIFICATE OF CORRECTION (continued)
U.S. Pat. No. 9,912,480 B2

Column 3, Line 41, "predetermine" to read as -- pre-determine --.

Column 3, Line 54, "SF3," to read as -- SF3. --.

Column 3, Line 58, "described," to read as -- described --.

Column 4, Line 30, "NSH" to read as -- NSH 30 --.

Column 4, Line 32, "limned" to read as -- limited --.

Column 4, Line 34, "stalled" to read as -- skilled --.

Column 4, Line 34, "fee" to read as -- the --.

Column 4, Line 47, "tire" to read as -- the --.

Column 5, Line 1, "a symmetric" to read as -- asymmetric --.

Column 5, Line 2, "cipher-test" to read as -- cipher-text --.

Column 5, Line 6, "credential" to read as -- credentials --.

Column 5, Line 29, "GDOL" to read as -- GDOI --.

Column 6, Line 19, "ticker" to read as -- ticket --.

Column 6, Line 51, "fee" to read as -- the --.

Column 6, Line 65, "fee" to read as -- the --.

Column 7, Line 2, "fee" to read as -- the --.

Column 7, Line 10, "fee" to read as -- the --.

Column 8, Line 5, "reference 10" to read as -- reference to --.

Column 8, Line 13, "identity" to read as -- identify --.

Column 8, Line 36, "fee" to read as -- the --.

Column 8, Line 40, "fee" to read as -- the --.

Column 9, Line 49, "tire" to read as -- the --.

Column 9, Line 62, "It" to read as -- If --.

CERTIFICATE OF CORRECTION (continued)
U.S. Pat. No. 9,912,480 B2

Column 9, Line 62, "encryption desired" to read as -- encryption is desired --.

Column 9, Line 64, "Tins older" to read as -- This order --.

Column 10, Line 11, "tor" to read as -- for --.

Column 10, Line 41, "be." to read as -- be --.

Column 10, Line 67, "fee" to read as -- the --.

Column 11, Line 14, "extinguishing" to read as -- distinguishing --.

Column 11, Line 57, "tire" to read as -- the --.

Column 11, Line 65, "tire" to read as -- the --.

Column 12, Line 21, "will," to read as -- will --.

Column 12, Line 23, "encrypted," to read as -- encrypted --.

Column 12, Line 53, "earned" to read as -- carried --.

Column 13, Line 7, "RFC5116of" to read as -- RFC5116 of --.

Column 13, Line 17, "earned" to read as -- carried --.

Column 13, Line 39, "disclosure," to read as -- disclosure --.

In the Claims

In Claim 1, Column 13, Line 56, "of" to read as -- or --.

In Claim 1, Column 14, Line 3, "tag" to read as -- tag in --.

In Claim 3, Column 14, Line 24, "comprising;" to read as -- comprising: --.

In Claim 3, Column 14, Line 25, "trona" to read as -- from --.

In Claim 5, Column 14, Line 31, "encrypted generation" to read as -- encrypted key generation --.

In Claim 6, Column 14, Line 33, "to further claim" to read as -- to claim --.

In Claim 7, Column 14, Line 38, "comunication" to read as -- communication --.

In Claim 7, Column 14, Line 59, "for the at least" to read as -- for at least --.

CERTIFICATE OF CORRECTION (continued)
U.S. Pat. No. 9,912,480 B2

In Claim 8, Column 15, Line 18, "frrom" to read as -- from --.

In Claim 8, Column 15, Line 25, "for least" to read as -- for at least --.

In Claim 9, Column 15, Line 45, "decryting" to read as -- decrypting --.

In Claim 10, Column 16, Line 1, "metnod" to read as -- method --.

In Claim 10, Column 16, Line 3, "to 8" to read as -- to claim 8 --.

In Claim 15, Column 16, Line 18, "a file network" to read as -- a network --.

In Claim 15, Column 16, Line 37, "authentcation" to read as -- authentication --.

In Claim 15, Column 16, Line 42, "header," to read as -- header --.